Aug. 16, 1938. W. E. GIBBS 2,127,112
SAW TOOTH
Filed Jan. 12, 1937
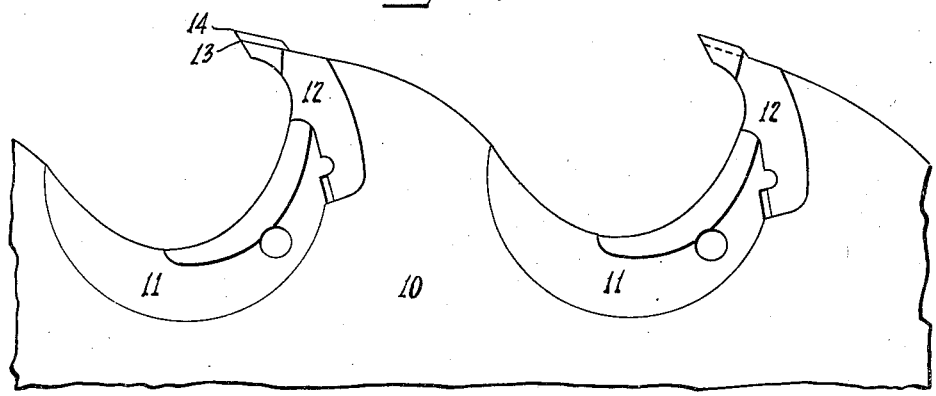
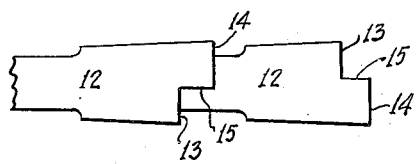
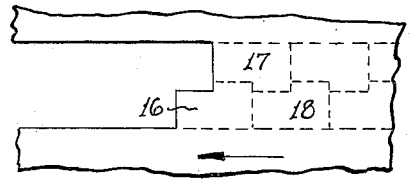
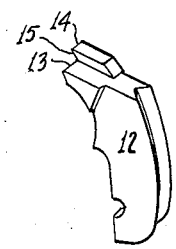
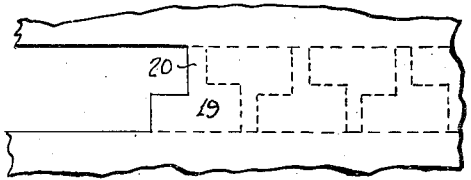
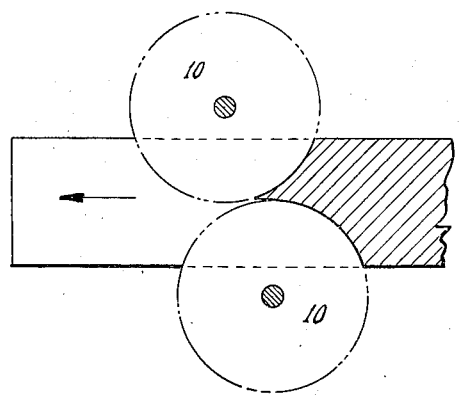
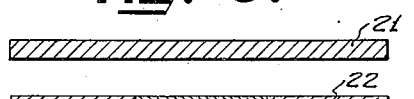
INVENTOR
W. E. GIBBS
BY
ATTORNEY Patented Aug. 16, 1938

2,127,112

UNITED STATES PATENT OFFICE 2,127,112

SAW TOOTH

William E. Gibbs, Milwaukie, Oreg.

Application January 12, 1937, Serial No. 120,150

4 Claims. (Cl. 143—141)

This invention relates generally to saws and particularly to saws having removable teeth.

The main object of this invention is the provision of a form of insert tooth adapted to improve the cutting action of the tooth by causing same to produce relatively thick, narrow chips compared with the thin, wide chips ordinarily formed, and by alternating the cuts between opposite sides of the saw.

The second object is the construction of a saw tooth, the use of which will greatly reduce the amount of fine dust and shavings, thereby improving the operating conditions in the mill and reducing the friction which dust normally produces in moving parts of machinery, as well as improving the quality of the sawdust from the fuel standpoint.

The third object is to construct a saw tooth of the class described which will make possible the use of an upset swage.

The fourth object is the construction of a saw tooth having two cutting edges, one of which is in advance of the other and in which one or two of the cutting edges can be brought into action, depending upon the rapidity of the feed of the work in relation to the speed of the saw.

I accomplish these and other objects in the manner set forth in the following specification as illustrated in the accompanying drawing, in which:

Fig. 1 is a fragmentary view showing two of my improved saw teeth in place.

Fig. 2 is a perspective view of an insert tooth showing my improved cutting lip applied thereto.

Fig. 3 is a fragmentary edge elevation of a saw equipped with my special form of tooth.

Fig. 4 is a fragmentary view showing somewhat in diagram the alternate cutting action of the teeth in which the work is advanced at a speed which will cause only one cutting portion of each tooth to function at a time.

Fig. 5 is a view similar to Fig. 4 showing the speed of the work increased in a manner to cause both cutting edges of each tooth to function at one time.

Fig. 6 shows a cross-section of a chip formed by an ordinary cutter of the raker or chisel type.

Fig. 7 is a cross-sectional view showing the chips formed by the saw described in my Patent No. 2,024,520.

Fig. 8 is a cross-section through a chip formed by my improved tooth.

Fig. 9 is a fragmentary side elevation of a pair of saws showing their relationship to a log which they are sawing.

Similar numbers of reference refer to similar parts throughout the several views.

Before entering into an explanation of this invention, attention is drawn to my Patent No. 2,024,520, over which the tooth described herein is an improvement.

In order to illustrate my invention, I have shown a portion 10 of a saw which may be either in a circular form as shown in Fig. 9 or of the band type. The usual tooth holders 11 are shown in position to hold the insert 12.

Referring particularly to my invention, it will be seen that the insert tooth 12 is provided with two cutting edges 13 and 14 which, for the purpose of explanation, will be referred to as the inner and outer cutting edges, respectively. It will be noted in Fig. 3 that the outer cutting edge 14 of one tooth 12 is opposite the outer cutting edge 14 of the next adjacent tooth and that the inner cutting edge 13 of one tooth 12 is opposite the inner cutting edge 13 of the next adjacent tooth. It will also be noted that the intermediate faces 15 of adjacent teeth overlap.

In the operation of this form of saw tooth, as shown in Fig. 4, the outer cutting edges 14 only serve to remove the wood, and an area 16 corresponding with the one shown in cross section in Fig. 4 represents the amount of chip removed by one tooth while the following tooth will remove a chip corresponding with the area 17. The next adjacent tooth will remove a chip corresponding with the area 18 and so on.

It will be noted in Fig. 5 that the chip area 19 has a lateral extension 20. This is due to the fact that an increase in the speed at which the work is moved past the saw causes both the cutting edges 13 and 14 to be effective. In other words, if the saw is crowded, its ability to cut will be increased, although the proportion of fine dust will be slightly increased; whereas if the saw is operated in a manner to cause the cut to be formed as shown in Fig. 4, the minimum amount of power will be required to operate the saw, and the dust will be more uniformly coarse, which is advantageous for the various reasons stated.

In Figs. 6, 7 and 8 is illustrated in cross section a group of three forms of chips. The chip 21 represents the chip formed by the ordinary saw tooth of the raker or chisel type, which extends from one side of the kerf to the other. The chip 22 represents three narrow chips which are formed by the saw tooth illustrated in my patent herein identified. The chips 22 are substantially the same thickness as the chips 21 and their tooth width is the same while the chip 23, formed by my improved tooth, is slightly wider than half the width of the saw kerf but twice as thick as are the chips 21 and 22. This illustrates the main reason for constructing the teeth in the manner herein described.

While I refer generally to the application of this invention to an insert tooth, it must be understood that it will apply equally well to a solid tooth on a circular or band saw by the use of a suitable die in a swaging device.

I claim:

1. An insert tooth having its outermost cutting edge stepped by having one side higher than the other and having the portions thereof substantially normal to the plane of the saw, the cutting faces of said stepped portions having a greater total width than does the portion of the tooth immediately behind said cutting edges, said tooth having a curved back and having the planes of the outer faces intersecting the line of curvature of said back.

2. An insert tooth having its outermost cutting edge stepped by having its one side higher than the other and having the portions thereof substantially normal to the plane of the saw, the cutting faces of the stepped portions having a greater total width than does the portion of the tooth immediately behind said cutting edges, said tooth having a curved back which intersects the planes of the outer faces of said steps.

3. An insert tooth of the class described having its cutting edge transversely stepped, one of said steps extending in advance of the other step and having the outer faces of the steps substantially in parallelism with each other and having the rearmost portion of the step cut away to the outer face of the inner step, said tooth having a curved back intersecting the planes of the outer faces of said steps.

4. An insert tooth having its outer face divided into two steps, each of which tapers from its cutting edge to its trailing end, the portion of said tooth which forms the outer step lying entirely outside of the portion which forms the inner step, the outer step having the greater width; a portion of said outer step extending in advance of the inner step and extending rearwardly to approximately the middle of the length of the inner step.

WILLIAM E. GIBBS.